United States Patent
Schilling

(10) Patent No.: US 8,519,263 B2
(45) Date of Patent: Aug. 27, 2013

(54) BELOW GROUND COMPONENT ENCLOSURE

(75) Inventor: Robert J. Schilling, Port St. Lucie, FL (US)

(73) Assignee: Clear View Enclosures, Inc., Cupertino, CA (US)

( * ) Notice: Subject to any disclaimer, the term of this patent is extended or adjusted under 35 U.S.C. 154(b) by 299 days.

(21) Appl. No.: 12/465,909

(22) Filed: May 14, 2009

(65) Prior Publication Data

US 2010/0288523 A1    Nov. 18, 2010

(51) Int. Cl.
*H02G 9/00* (2006.01)

(52) U.S. Cl.
USPC ............. 174/37; 174/38; 187/345; 187/346; 187/347; 439/131; 439/132

(58) Field of Classification Search
USPC ............. 174/37, 38; 439/131, 132; 187/345, 187/346, 347
See application file for complete search history.

(56) References Cited

U.S. PATENT DOCUMENTS

| | | | |
|---|---|---|---|
| 2,843,349 A | 7/1958 | Meyer | |
| 3,208,556 A * | 9/1965 | Shaffer | 187/226 |
| 3,984,942 A | 10/1976 | Schroth | |
| 4,363,380 A * | 12/1982 | Rued et al. | 187/274 |
| 4,375,104 A | 2/1983 | Starr et al. | |
| 4,683,988 A * | 8/1987 | Shrum, Jr. | 187/234 |
| 4,786,032 A | 11/1988 | Garman | |
| 5,189,723 A | 2/1993 | Johnson et al. | |
| 5,216,577 A | 6/1993 | Schilling | |
| 2,310,309 A | 2/1994 | Orr | |
| 5,476,050 A | 12/1995 | Zimmer et al. | |
| 5,934,414 A | 8/1999 | Staczek | |
| 6,031,180 A * | 2/2000 | Schilling et al. | 174/37 |
| 6,182,796 B1 | 2/2001 | Perlstein et al. | |
| 6,296,006 B1 | 10/2001 | Wegner | |
| 6,783,198 B2 | 8/2004 | Rudd et al. | |

(Continued)

FOREIGN PATENT DOCUMENTS

JP    2000034097 A    2/2000

OTHER PUBLICATIONS

Schilling, Robert J., Venting System for an Underground Enclosure, Pending Patent Application, Filed Apr. 16, 2008, U.S. Appl. No. 12/104,264.

(Continued)

*Primary Examiner* — Hung S Bui
*Assistant Examiner* — James Wu
(74) *Attorney, Agent, or Firm* — Brian B. Shaw, Esq.; Jodi A. Reynolds, Esq.; Harter Secrest & Emery LLP

(57) ABSTRACT

A below ground component management system includes a base plate disposed below a ground surface, a sleeve connected to the base plate and extending substantially perpendicular thereto toward the ground surface, and a cover sealably connected to an upper opening of the sleeve to form a substantially fluid-tight compartment with the base plate and the sleeve. The system also includes a component rack disposed within the compartment, and an actuator assembly configured to pass at least a portion of the rack through the opening. The actuator assembly includes a bracket, and first and second cylinders connected to the bracket. The first cylinder has a piston extending toward the base plate and the second cylinder has a piston extending toward the opening.

28 Claims, 5 Drawing Sheets

(56) References Cited

U.S. PATENT DOCUMENTS

| | | | |
|---|---|---|---|
| 6,883,641 B2 | 4/2005 | Julien | |
| 7,033,066 B2 * | 4/2006 | Helder | 366/68 |
| 7,178,810 B1 | 2/2007 | Kuhary | |
| 7,330,625 B2 | 2/2008 | Barth | |
| 7,333,320 B2 | 2/2008 | Standish et al. | |
| 7,645,105 B2 | 1/2010 | Hengel et al. | |
| 2003/0213653 A1 | 11/2003 | Morris | |
| 2006/0180403 A1 | 8/2006 | Hanlon | |

OTHER PUBLICATIONS

Schilling, Robert J., Retention System for an Inflatable Seal, Pending Patent Application, Filed Jun. 12, 2008, U.S. Appl. No. 12/138,148.

Schilling, Robert J., Underground Enclosure System for Storing Components, Cables, ands the Like, Pending Patent Application, Filed Apr. 16, 2008, U.S. Appl. No. 12/104,239.

* cited by examiner

BELOW GROUND COMPONENT ENCLOSURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

FIELD OF THE INVENTION

The present disclosure relates to a component management system, and more particularly, to a below ground component management system configured to maintain cables and electronic equipment in a pressurized environment.

BACKGROUND OF THE INVENTION

A number of devices exist for securing underground wiring, cable, and/or other electrical conduit connections underground, and a number of these devices are configured to allow for selective access to the components stored underground for maintenance. As the number of, for example, cables and/or other electrical components being disposed underground increases, so to does the need for underground enclosures that are configured to accommodate such components in a variety of soil and/or other environmental conditions. For example, although it is desirable to dispose such electrical components underground so as not to disturb the aesthetic beauty of public, residential, and/or other areas of nature, not all areas or environments are suitable for storing such electrical components underground. In particular, damp soil in regions of high annual precipitation may be less suitable for storing electrical components underground than environments that are relatively dry, due to the possibility that ground water may seep into underground storage systems and disturb the electrical connections and/or components disposed therein. In addition, the electrical components stored in such systems are often heavy and difficult for a single technician to manipulate. For instance, the cables themselves may be relatively heavy-duty, rigid, and/or heavy, further inhibiting both access to and manipulation of the electrical cables and/or other components stored in the underground systems. It is also understood that such underground management systems are typically designed to be as small as possible since being relatively compact decreases the interference with natural surroundings, and minimizes the overall material cost for manufacturing such systems.

However, the difficulties associated with storing electrical components underground has not reduced the reliance on such practices in the cable, telecommunications, and other industries. In addition, the components used in these different industries often have a variety of system requirements. For example, traffic control devices generate a significant quantity of heat that must be dissipated therefrom, while fiber optic devices must be securely protected from moisture and other environmental factors. Moreover, users typically require relatively easy access to the components stored below ground for routine maintenance and other services.

Although known component management systems may provide a relatively secure environment for the storage of electrical components, such systems do not typically offer enhanced resistance to environmental penetration. Nor are such systems configured to allow for easy access to the equipment stored therein for maintenance and other purposes. In particular, because the electrical equipment stored in such systems is often kept ten to twelve feet below ground, access to such components is difficult once the components are disposed within known component management systems. As discussed above, known systems are designed to have as small of a footprint as possible, which can make it difficult for maintenance personnel to enter such systems for servicing the components.

The various embodiments disclosed herein overcome the deficiencies described above with respect to known component management systems.

BRIEF SUMMARY OF THE INVENTION

In an exemplary embodiment of the present disclosure, a below ground component management system includes a base plate disposed below a ground surface, a sleeve connected to the base plate and extending substantially perpendicular thereto toward the ground surface, and a cover sealably connected to an upper opening of the sleeve to form a substantially fluid-tight compartment with the base plate and the sleeve. The system also includes a component rack disposed within the compartment and an actuator assembly configured to pass at least a portion of the rack through the opening. The actuator assembly includes a bracket, and first and second cylinders connected to the bracket. The first cylinder includes a piston extending toward the base plate and the second cylinder includes a piston extending toward the opening.

In another exemplary embodiment of the present disclosure, an actuator assembly includes a first cylinder coupled to a bracket and a second cylinder coupled to the bracket. A piston of the first cylinder is configured to extend in a first direction and a piston of the second cylinder is configured to extend in a second direction substantially parallel to and opposite the first direction. The actuator assembly also includes a plurality of slidably connected guiderails. The piston of the first cylinder and at least one guiderail of the plurality of guiderails are fixedly mounted relative to a base plate supporting the actuator assembly.

In a further exemplary embodiment of the present disclosure, an actuator assembly includes a first cylinder secured to a first bracket, the first cylinder includes a piston secured to a base plate and extendable from the first cylinder to elevate the bracket away from the base plate. The actuator assembly also includes a second cylinder secured to the first bracket. The second cylinder includes a piston secured to a component rack and extendable from the second cylinder to elevate the rack relative to the bracket.

In still another exemplary embodiment of the present disclosure, a method of accessing components stored below ground includes transitioning a piston of a first cylinder from a retracted position within the first cylinder to an extended position outside of the first cylinder. The piston of the first cylinder is fixedly mounted relative to a base plate disposed below a ground surface. The method also includes transitioning a piston of a second cylinder from a retracted position within the second cylinder to an extended position outside of the second cylinder. The first and second cylinders are linked via a bracket, and the piston of the second cylinder is connected to a component rack supported by the base plate. The method also includes guiding motion of the rack towards the ground surface with a guide rail assembly mounted to the base plate.

BRIEF DESCRIPTION OF THE SEVERAL VIEWS OF THE DRAWING(S)

DETAILED DESCRIPTION OF THE INVENTION

Figure 1:
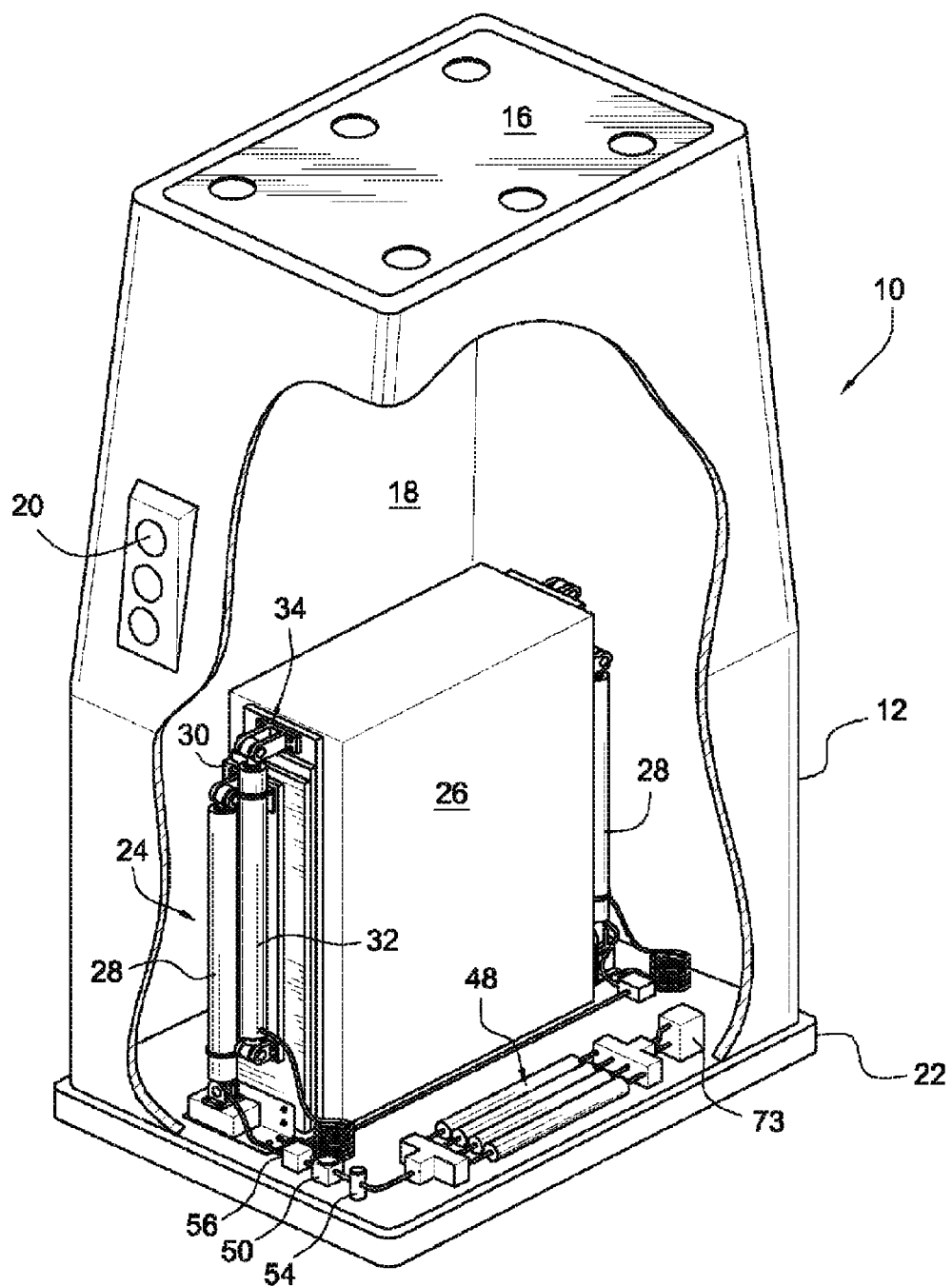
FIG. 1 is a partial perspective view of a below ground component management system according to an exemplary embodiment of the present disclosure.
Figure 4:
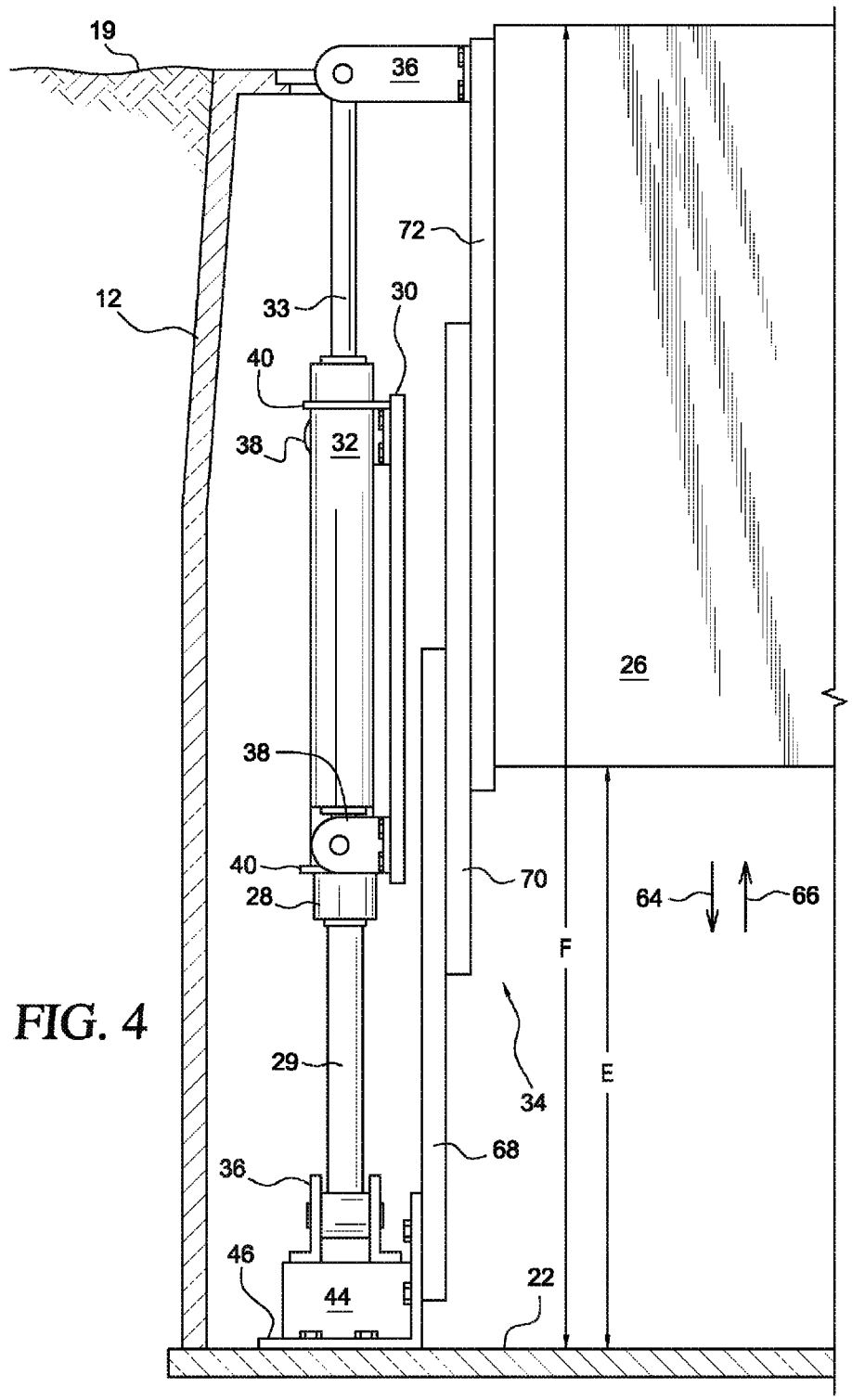
FIG. 4 is an additional partial front view of the system shown in FIG. 2.

As shown in FIG. 1, in an exemplary embodiment of the present disclosure a component management system 10 may include, among other things, a sleeve 12 connected to a base plate 22 that is disposed below a ground surface 19 (FIG. 4). The sleeve 12 may extend substantially perpendicular to the base plate 22 and a cover 16 of the component management system 10 may be sealably connected to an upper opening 14 of the sleeve 12 to form a substantially fluid-tight compartment 18 with the base plate 22 and the sleeve 12. An exemplary component management system 10 may also include a component rack 26 disposed within the substantially fluid-tight compartment 18. The component management system 10 may also include an actuator assembly 24 configured to pass at least a portion of the rack 26 through the opening 14 of the sleeve 12.

As shown in FIGS. 1-5, the base plate 22 may form the bottom of the component management system 10 and may include a generally planar upper surface for cooperatively engaging the sleeve 12, and for supporting the rack 26 and/or the actuator assembly 24. In an exemplary embodiment, the upper surface of the base plate 22 may define a groove (not shown) and/or other like structure proximate a perimeter of the base plate 22. The groove may be configured to receive at least a portion of the sleeve 12, thereby acting as a seating surface for the sleeve 12.

The base plate 22 may also include one or more water collection surfaces for concentrating and/or otherwise retaining water or other liquids that may enter the component management system 10 during use or upon opening of the cover 16. Such water collecting surfaces may assist in guiding such liquids to a single location within the component management system 10 for easy removal thereof. The water collection surfaces may also guide such liquids away from, for example, the component rack 26 to minimize damage to and/or malfunctioning of components stored thereon.

The base plate 22 may be formed of any materials known in the art such as, for example, polymer concrete or fiberglass reinforced polymer (FRP). The base plate 22 may also include one or more connection devices configured to assist in, for example, sealably connecting the sleeve 12 to the base plate 22 in a below ground environment. The base plate 22 may also include, for example, gaskets, caulking, and/or other components configured to assist in forming a substantially fluid-tight seal between the sleeve 12 and the base plate 22.

Figure 5:
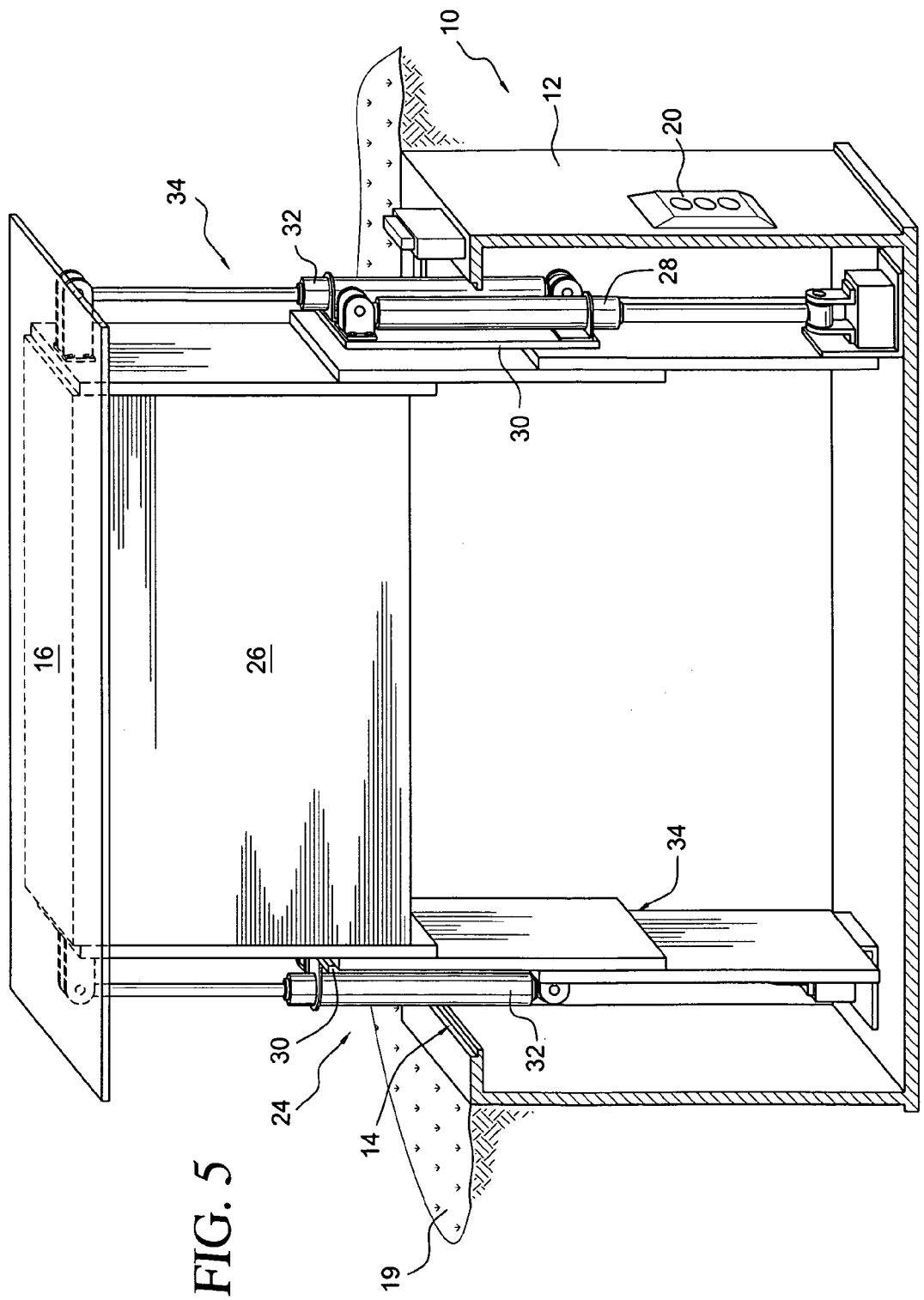
FIG. 5 is a partial perspective view of a below ground component management system according to another exemplary embodiment of the present disclosure.

Although shown in a generally frusto-pyramid shape in FIG. 1, the sleeve 12 may have any shape, size, and/or other configuration known in the art to assist in housing the component rack 26 below ground. For example, in an additional embodiment of the component management system 10, such as the embodiment shown in FIG. 5, the sleeve 12 may be substantially square or substantially rectangular. A bottom end of the sleeve 12 may include, for example, a seating ridge sized and/or otherwise configured to be received within the groove of the base plate 22 discussed above. The sleeve 12 may also include one or more connection devices corresponding to such devices on the base plate 22 to assist in sealably connecting the sleeve 12 to the base plate 22. The sleeve 12 may be any of a variety of different heights thereby extending or reducing the distance between, for example, the opening 14 and the base plate 22. As shown in FIG. 1, the sleeve 12 may define a vacant space between, for example, the top of the rack 26 and the opening 14 when the actuator assembly 24 is in a de-energized state. This vacant area may be of any shape and/or size, and may have any desirable distance between the top of the rack 26 and, for example, the cover 16. Alternatively, the sleeve 12 may be formed such that the top of the rack 26 is substantially adjacent to the under side of the cover 16 when the cover 16 is sealably connected to the opening 14 of the sleeve 12. For example, as shown in FIG. 5, in an exemplary embodiment, the cover 16 may be removably connected to the top of the rack 26. One of skill in the art will recognize that minimizing the distance between, for example, the top of the rack 26 and the cover 16 may reduce the overall footprint of the component management system 10, thereby minimizing the size of the hole required for storing the component management system 10 below ground.

The sleeve 12 may be formed from any of the materials described above with respect to the base plate 22. For example, the sleeve 12 may be formed from a polymer concrete or FRP. Although not clearly shown in FIG. 1, it is understood that the sleeve 12 may also include one or more structures proximate the opening 14 to facilitate, for example, mounting, sealably connecting, and/or removing the cover 16. Such structures may include, for example, a collar, a groove, a ridge, a shoulder, and/or known seating surfaces. The sleeve 12 and the cover 16 may also include corresponding locking mechanisms configured to assist in sealably connecting the cover 16 to the sleeve 12.

The sleeve 12 may also include at least one port 20 configured to enable the passage of cables into and out of the sleeve 12. In an exemplary embodiment, the port 20 may include piping such as PVC piping that is molded into and/or otherwise connected to the sleeve 12. The piping may have any of a variety of lengths as dictated by design considerations. In addition, a substantially fluid-tight seal may be formed between the one or more ports 20 and the cables or piping passing therethrough. Such a seal may be formed by adhesives, epoxy, and/or other known sealant materials.

The cover 16 may be, for example, a substantially planar structure configured to align with the opening 14 of the sleeve 12. The cover 16 may include, for example, any one of a number of structures configured to mate with seating surfaces and/or structures of the sleeve 12. For example, the cover 16 may include a skirt and/or a peripheral seal surface configured to cooperatively align and mate with corresponding structures of the sleeve 12 disposed proximate the opening 14. Such structures of the cover 16 may be sized and/or otherwise configured to dispose a top of the cover 16 substantially coplanar with a top of the sleeve 12. Alternatively, the cover 16 may be configured to sit on top of sleeve 12 such that the cover 16 substantially covers a top surface of the sleeve 12.

The cover 16 may further include a plurality of locking mechanisms corresponding to similar mechanisms connected to the sleeve 12. In an exemplary embodiment, the locking mechanisms of the cover 16 may mate with corresponding mechanisms of the sleeve 12 to assist in sealably connecting the cover 16 to the opening 14. The cover 16 may be formed from materials similar to those described above with respect to the sleeve 12 and the base plate 22. For example, the cover 16 may be formed from a polymer concrete or FRP. The cover 16 may also include reinforcing elements such as re-bar to enhance the load bearing capacity of the cover 16.

It is understood that the materials used in forming the cover 16, sleeve 12, and base plate 22 may be chosen for their strength, ability to form a substantially fluid-tight compartment, and their ability to dissipate heat that is generated by the equipment stored within the component management system 10. As the component management system 10 is located below ground, the cover 16, sleeve 12, and base plate 22 may be surrounded by dirt and/or soil. Thus, the cover 16, sleeve 12, and base plate 22, together with the surrounding earth, may function as a heat sink for the dissipation of undesired heat within the sealed component management system 10. It may be desirable for the component management system 10 to be able to dissipate substantially more heat than is generated by, for example, the equipment stored therein. For example, equipment stored in the rack 26 may generate approximately 6,000 BTU/hr and the materials used to form the cover 16, sleeve 12, and base plate 22 may be capable of dissipating substantially greater than 6,000 BTU/hr. For example, elements of the component management system 10 formed of FRP may be capable of dissipating approximately 10,000 BTU/hr.

Moreover, whereas the sleeve 12 may be substantially permanently connected and sealed to the base plate 22, it is understood that the seal formed between the cover 16 and the sleeve 12, although substantially fluid-tight, may be releasable and configured for repeated closure and sealing. Accordingly, the cover 16 and/or the sleeve 12 may include one or more rings, gaskets, foams, deformable seating materials, and/or other known components to assist in forming such a seal. In an exemplary embodiment, the combination of the elements forming the substantially fluid-tight seal between the cover 16 and the sleeve 12 are such that they may function as a pressure relief valve. In such an exemplary embodiment, if excess pressure develops within the sealed component management system 10, the seal between the cover 16 and the sleeve 12 may be configured to fail locally, thereby permitting the excess pressure within the component management system 10 to vent between the cover 16 and the sleeve 12 around the seals.

The rack 26 shown in FIGS. 1-5 may be movably disposed within the substantially fluid-tight compartment 18, and the rack 26 may be vertically movable relative to the base plate 22 from a retracted position within the sleeve 12 to an extended position in which at least a portion of the rack 26 and, preferably the entire rack 26 is disposed above and outside of the sleeve 12. As will be described in greater detail below, the actuator assembly 24 and the guiderail assembly 34 may assist in transitioning the rack 26 between the extended position and the retracted position. Although the rack 26 may be any of a variety of sizes, the rack 26 may be configured to support equipment that is standard in, for example, the telecommunications, power distribution, cable, fiber optic, traffic control, and/or other industries. Accordingly, the rack 26 may be, for example, a standard 23-inch equipment rack or a standard 19-inch equipment rack suitable for use in such industries.

The actuator assembly 24 may include, for example, a bracket 30, and first and second cylinders 28, 32 connected to the bracket 30. The component management system 10 may include an actuator assembly 24 and a guiderail assembly 34 on both sides of the rack 26. As shown in, for example, FIG. 4, the first cylinder 28 may include a piston 29 extending toward the base plate 22, and the second cylinder 32 may include a piston 33 extending toward the opening 14 of the sleeve 12. Thus, the piston 29 of the first cylinder 28 may be configured to extend in a first direction and the piston 33 of the second cylinder 32 may be configured to extend in a second direction substantially parallel to and opposite from the first direction. The first and second cylinders 28, 32 may be configured to elevate the rack 26 any desirable distance such as, for example, a distance equal to approximately twice the stroke of one of the pistons 29, 33 of the first and second cylinders 28, 32. Such elevation is made possible due to the cylinders 20, 32 being mounted in opposite directions on the bracket 30. It is understood that the cylinders 28, 32 may be activated individually. Alternatively, the cylinders 28, 32 may be activated simultaneously such that the pistons 29, 33 extend from the respective cylinders 28, 32 at substantially the same time and/or at substantially the same rate.

Although the cylinders 28, 32 may be substantially rigidly connected to the bracket 30, the piston 29 may be coupled and/or otherwise connected to a support structure that is secured to the base plate 22 while the piston 33 may be coupled and/or otherwise connected to a structure that is mounted to the rack 26. In an exemplary embodiment, the piston 33 may be rigidly connected to the rack 26 through a mount, bracket, and/or other like structure. In still another exemplary embodiment, the piston 33 may be coupled to at least a portion of the guiderail assembly 34, and the guiderail assembly 34 may be configured to direct the movement of the rack 26 between the retracted position and the extended position. Thus, the piston 29 of the first cylinder 28 may be extendable from the cylinder 28 to elevate the bracket 30 away from the base plate 22 and the piston 33 of the second cylinder 32 may be extendable from the cylinder 32 to elevate the rack 26 relative to the bracket 30.

The components of the actuator assembly 24 and/or the guiderail assembly 34 may be configured to elevate the rack 26 at any desirable angle relative to the base plate 22. In an exemplary embodiment, the first cylinder 28 may be mounted and/or otherwise configured to elevate the bracket 30 along a path that is substantially perpendicular to the base plate 22 while the second cylinder 32 may be mounted and/or otherwise configured to elevate the rack 26 along a path that is substantially perpendicular to the base plate 22. It is understood that the guiderail assembly 34 may be connected to the base plate 22 and configured to guide the motion of the rack 26 along a path that is, for example, substantially perpendicular to the base plate 22.

Figure 2:
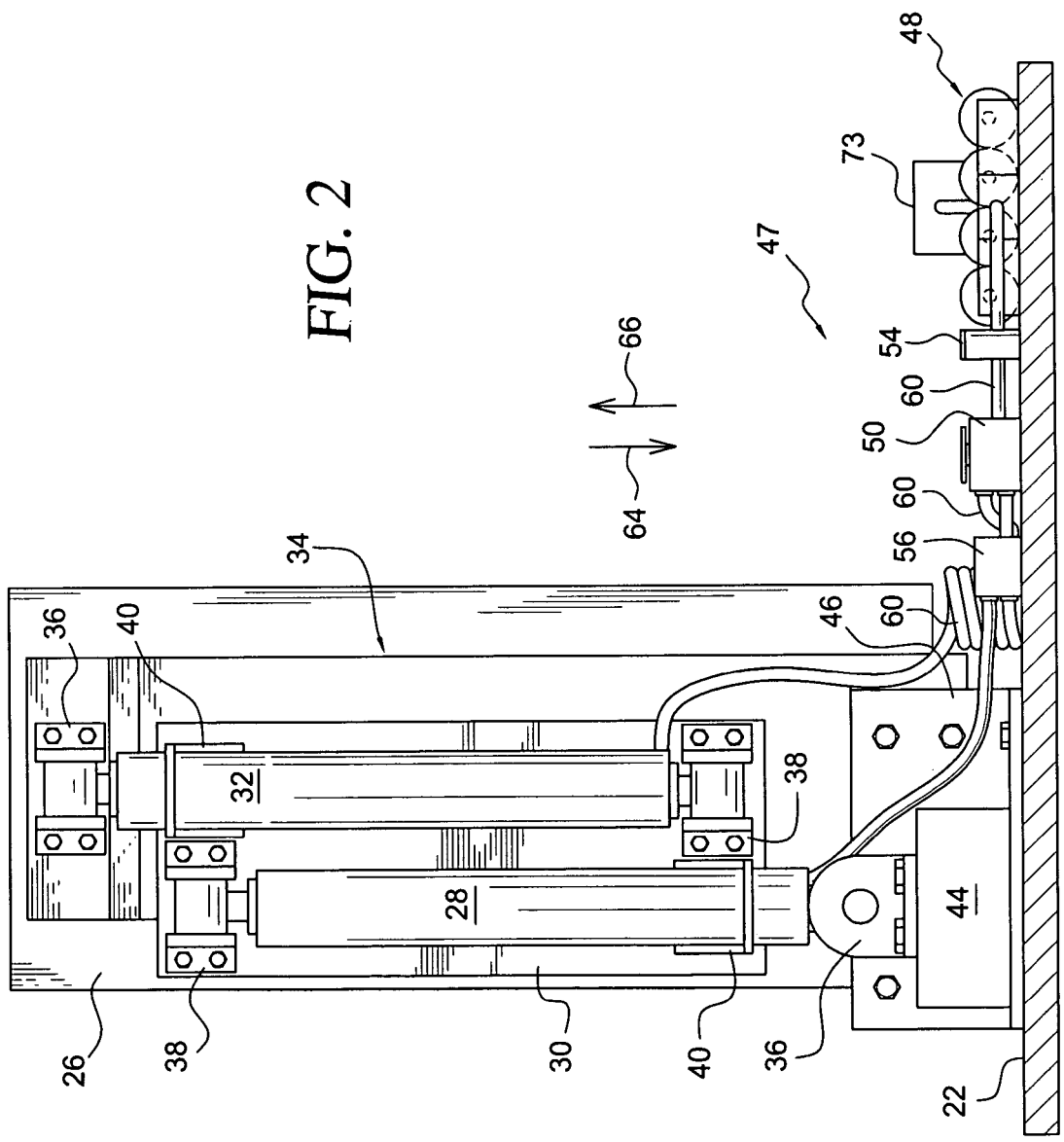
FIG. 2 is a partial side elevation view of the system shown in FIG. 1 according to an exemplary embodiment of the present disclosure.

As illustrated in FIGS. 1-5, the first and second cylinders 28, 32 may be, for example, pneumatic cylinders. The cylinders 28, 32 may be controlled to move between a retracted position and an extended position. As shown in FIG. 2, each of the cylinders 28, 32 may be fluidly connected to a pressurized gas source 48. The pressurized gas source 48 may be, for example, one or more tanks or other storage devices configured to controllably release fluids such as, for example, pressurized air. In an exemplary embodiment, the pressurized gas source 48 may be one or more pressurized air tanks and may include additional components such as, for example, one or more compressors or air dryers 73 configured to maintain gas within the pressurized air tanks at a desired pressure. The pressurized gas source 48 may be employed to pressurize, for example, the interior of the component management system 10, the locking mechanisms discussed above, and/or the components discussed above forming the substantially fluid-tight seal between the sleeve 12 and the cover 16. The pressurized gas source 48 may also be employed to assist in moving the rack 26 between the retracted position and the extended position. Thus, the pressurized gas source 48 may be selectively fluidly connected to the interior of the component management system 10, the first and second cylinders 28, 32, and the other components and mechanisms discussed above. It is understood that the pressurized gas source 48 may contain any fluid known in the art such as, for example, pressurized oxygen, pressurized nitrogen, pressurized air, and/or other pressurized fluids.

The first and second cylinders 28, 30 may be fluidly connected to the pressurized gas source 48 via one or more pressurized fluid lines 60, and a variety of valving and other controls may be employed to assist in, for example, pressurizing the interior of the component management system 10, locking and sealing the cover 16 to the sleeve 12, and activating the cylinders 28, 32. For example, the pressurized gas source 48 may be fluidly connected to a pressure regulator 50 via, for example, a manifold or other like device. The pressure regulator 50 may receive a flow of gas from the pressurized gas source 48 at a first pressure and provide one or more output flows of the gas at desired second pressures. For example, the pressure regulator 50 may receive, via a manifold, a flow of pressurized gas from the pressurized gas source 48 at approximately 120 PSI. The pressure regulator 50 may then direct a first output flow of the gas at approximately 75-80 PSI to the first and second cylinders 28, 32, a second output flow of the gas at approximately 2.5 PSI to the interior of the component management system 10, and a third output flow of the gas at approximately 25 psi to the locking mechanisms and/or seal components discussed above. A pressurized fluid line 60 may extend from each of the one or more outlets of the pressure regulator 50, and the line 60 may fluidly connect the regulator 50 to the components discussed above. For example, the line 60 may direct the first flow to the cylinders 28, 32 for translating the rack 26 between the retracted and the extended positions.

It is understood that the pressure line 60 extending from the pressure regulator 50 to the cylinders 28, 32, the interior of the component management system 10, the locking mechanisms, and/or the seal components may include sufficient T connections, splits, manifolds, switches, solenoids, valves, and/or other components configured to selectively fluidly connect the regulator 50 thereto. For example, one or more solenoid-controlled valves 56 may be used to fluidly connect the pressure regulator 50 to the cylinders 28, 32, and each solenoid may be activated using an electronic switch or other like component. Similarly, the second output flow discussed above may be fluidly connected to the interior of the component management system 10 using such a switch-activated solenoid-controlled valve 56. In addition, the third output flow discussed above may be directed to a manifold, and a first flow of pressurized gas from the manifold may be fluidly connected to the locking mechanisms discussed above using one or more electronic switch-activated solenoid-controlled valves 56. A second flow of pressurized gas from the manifold may be fluidly connected to the seal components discussed above also using one or more electronic switch-activated solenoid-controlled valves 56.

A pressure sensor 54 may be fluidly connected to the input or output of, for example, the pressure regulator 50 to monitor the pressure of the gas passing to or from the pressure regulator 50. In additional exemplary embodiments, the pressure sensor 54 may be located at alternative locations to provide a pressure monitoring function. In additional exemplary embodiments, the pressure sensor 54 may be configured to provide an alarm upon a sensed pressure dipping below a desired threshold value.

The valves 56 discussed above may be any type of valve commonly known in the art such as, for example, one way control valves or the like. The valves 56 may be, for example, configured to permit an auxiliary introduction of a pressurized gas to assist in transitioning the cylinders 28, 32 between the retracted and the extended positions. The valve 56 may also preclude pressurized gas from bleeding toward the pressurized gas source 48. In an exemplary embodiment, at least one of the valves 56 may be configured to direct a flow of pressurized gas from the pressurized gas source 48 to the first and second cylinders 28, 32, and an additional valve 56 may be configured to assist in pressurizing, for example, the substantially fluid-tight compartment 18 of the component management system 10.

As discussed above, first and second cylinders 28, 32 may be disposed on both sides of the rack 26 to assist in moving the rack 26. Thus, one or more valve 56 may be configured to direct a flow of pressurized gas from the pressurized gas source 48 to the cylinders 28, 32 on both sides of the rack 26. In addition, although not explicitly referred to herein, it is understood that additional valving and/or other pressurization components may be fluidly connected to the pressurized gas source 48 to assist in transitioning the rack 26 between the extended position and the retracted position, and to assist in maintaining the substantially fluid-tight compartment 18 at a desired pressure.

Figure 3:
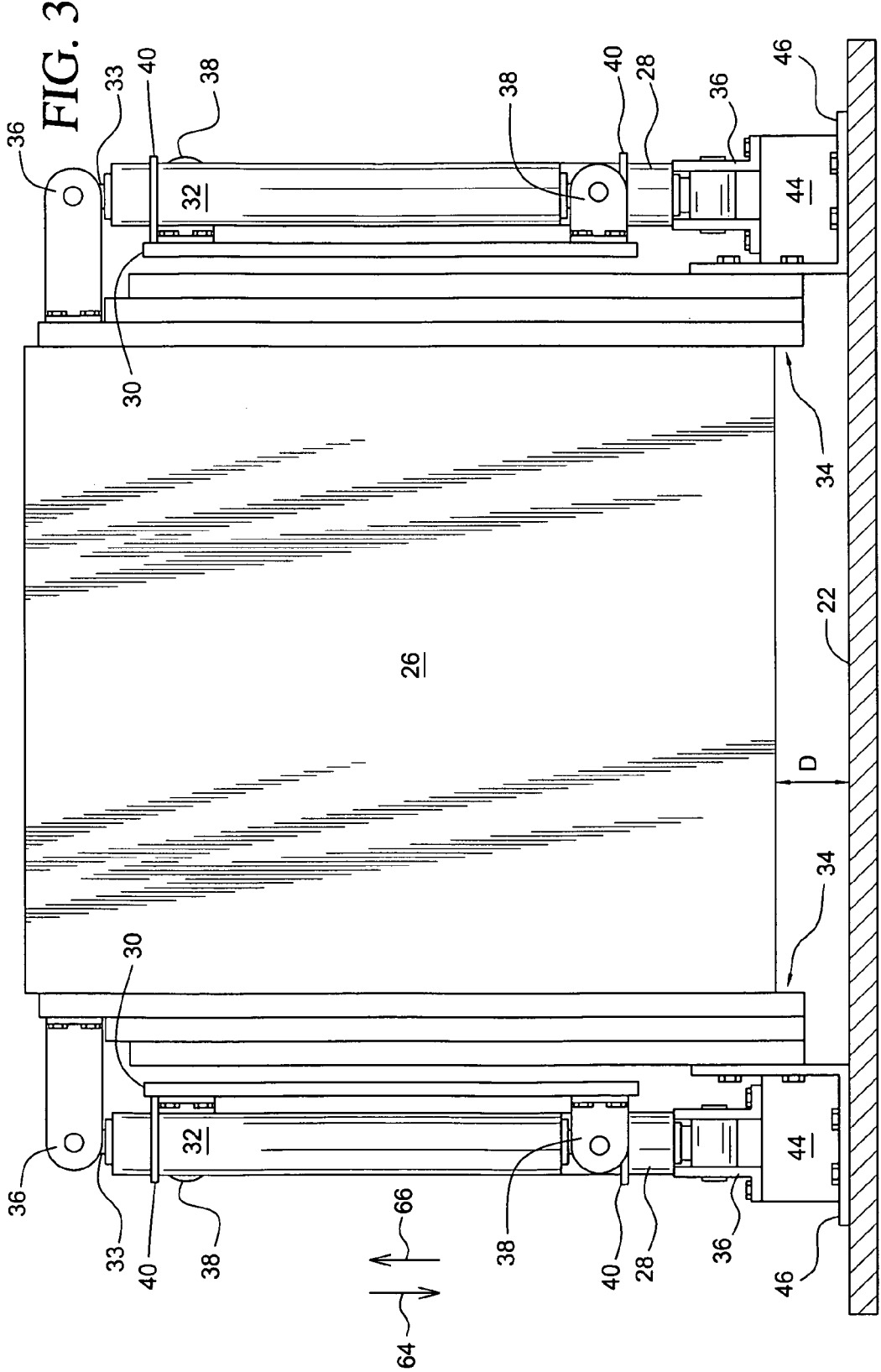
FIG. 3 is a partial front view of the system shown in FIG. 2.

As shown in FIGS. 1-5, the cylinders 28, 32 may be mounted to the bracket 30 using a plurality of mounts, guides, and/or other components. Such components may be configured to assist in stabilizing and/or supporting one or more of the cylinders 28, 32 as, for example, the rack 26 is transitioned between the retracted and the extended position. For example, as illustrated in FIGS. 2-4, a clevis of the first cylinder 28 may be connected to the bracket 30 via a clevis mount 38 disposed proximate a top end of the bracket 30. In an exemplary embodiment, a jam nut or other known mounting structure may also be provided to assist in substantially rigidly connecting the cylinder 28 to the clevis mount 38.

The first cylinder 28 may also be substantially rigidly connected to a guide 40 disposed at an opposite or bottom end of the bracket 30. The guide 40 may include one or more thru-holes and, in an exemplary embodiment, a portion of the first cylinder 28 may pass through the guide 40 when the piston 29 of the first cylinder 28 is in the extended and/or retracted position. As described above with respect to the clevis mount 38, one or more mounting structures such as, for example, a jam nut may be provided at the guide 40 to rigidly connect the cylinder 28 to the guide 40 while enabling the piston 29 to extend therefrom and retract therein.

The piston 29 may be substantially rigidly connected to a piston mount 36 in typical fashion, and the piston mount 36 may be supported by a spacer 44 mounted to the base plate 22. The piston mount 36 and spacer 44 may provide a stationary support for the piston 29 as the piston 29 is activated to move, for example, the bracket 30 and the rack 26 relative to the base plate 22. The spacer 44 may have any dimension and/or other configuration desirable for supporting, for example, the rack 26 in the extended position. The spacer 44 may be provided with, for example, one or more gussets configured to increase the overall strength and/or rigidity of the spacer 44. In an exemplary embodiment, the spacer 44 may be, for example, an L-shaped bracket having one or more gussets welded and/or otherwise connected thereto.

As shown in at least FIG. 2, the second cylinder 32 may be mounted to the bracket 30 using substantially the same components discussed above with respect to the first cylinder 28. For example, a clevis of the second cylinder 32 may be connected to the bracket 30 via a clevis mount 38 disposed proximate a bottom end of the bracket 30. In addition, the cylinder 32 may be secured to a guide 40 disposed proximate the top end of the bracket 30 opposite the clevis mount 38. The piston 33 of the second cylinder 32 may be connected to, for example, the component rack 26 via a piston mount 36. The piston mount 36 connecting the piston 33 to the rack 26 may be substantially similar to the piston mount 36 connecting the piston 29 of the first cylinder 28 to the spacer 44. Alternatively, at least the piston mount 36 connected to the piston 33 may be modified to further include one or more gussets welded and/or otherwise connected thereto to increase the strength and/or rigidity of the piston mount 36. The piston mount 36 connected to the piston 33 may also include, for example, a pivot pin thrust plate having one or more alignment tabs, holes, slots, and/or other structures configured to assist in aligning, for example, the component rack 26, the piston 33, and/or the bracket 30 upon connection. It is understood that additional connection and/or alignment structures such as, for example, flange nuts, fasteners, pivot pins, and/or alignment tabs may be provided to assist in connecting the piston 33 to the mount 36.

As shown in at least FIG. 3, substantially the same bracket 30 and connection structures may be provided for the second set of cylinders 28, 32 disposed on the other side of the rack 26. In addition, although described herein as being connected directly to the rack 26, it is understood that the piston 33 and/or piston mount 36 may be connected to, for example, the guiderail assembly 34 in other exemplary embodiments.

As shown in at least FIGS. 3 and 4, the guiderail assembly 34 may be rigidly connected to the base plate 22 via one or more L-brackets 46. It is understood that such L-brackets 46 may include, for example, one or more gussets or other structures configured to increase the strength and/or rigidity of the bracket 46. In an exemplary embodiment, the guiderail assembly 34 may assist in guiding, for example, the rack 26, the bracket 30, and/or the cylinders 28, 32 along a path substantially perpendicular to the base plate 22. The guiderail assembly 34 may include a plurality of extendable slides, columns, and/or other members controllable by the cylinders 28, 32. Such members may be, for example, interlocking telescoping members 68, 70, 72 that are square, rectangular, U-shaped, C-shaped, and/or otherwise configured for substantially linear actuation by the first and second cylinders 28, 32.

In an exemplary embodiment, at least one member of the guiderail assembly 34 may be substantially rigidly connected to the L-bracket 46 and/or the base plate 22 such that activation of at least one of the first and second cylinders 28, 32 may move at least one of the remaining members relative to the fixedly secured member. Such an exemplary guiderail assembly 34 is currently being manufactured by Barnes Engineering. The guiderail assembly 34 may be fully extended by, for example, activating both the first and second cylinders 28, 32 to elevate the rack 26 above ground through the opening 14, and substantially outside of, for example, the sleeve 12. By guiding the rack 26 in this way, the guiderail assembly 34 may assist in permitting access to the rack 26 or to the interior of the sleeve 12. Although the components of the guiderail assembly 34, such as the interlocking telescoping members 68, 70, 72, may be of any size and/or other configuration known in the art, the guiderail assembly 34 and its components may be configured to support and/or otherwise guide an industry standard 23-inch equipment rack 26.

As shown in at least FIGS. 3 and 4, at least one member 72 of the guiderail assembly 34 may be substantially rigidly connected to, for example, the rack 26 while another of the members 68 is substantially rigidly connected to the L-bracket 46. Alternatively, in an additional exemplary embodiment, the member 72 may be rigidly connected to both the rack 26, and the piston mount 36 attached to the piston 33. Additionally, as illustrated in at least FIG. 3, a guiderail assembly 34 may be provided on both sides of the equipment rack 26 to assist in guiding the rack 26 as it transitions between the extended position and the retracted position. In such an exemplary embodiment, it is understood that the first cylinders 28 may be activated in unison and the second cylinders 32 may also be activated in unison. As discussed above, the cylinders 28, 32 may have any size, shape, stroke, and/or other configuration useful in, for example, raising and lowering an equipment rack 26 stored in a below ground environment. In an exemplary embodiment, the cylinders 28, 32 may be substantially the same, and in such an exemplary embodiment, the cylinders 28, 32 may be approximately 37 inches long and may each have a stroke of approximately 37 inches. In such an exemplary embodiment, the configuration of the cylinders 28, 32 and the bracket 30 may facilitate to lifting the rack 26 such that a top portion of the rack 26 is approximately 135.625 inches above the base plate 22 in the extended position.

In operation, a hole may be formed in the ground 19, and the base plate 22 and sleeve 12 may be disposed within the hole such that a top portion of the sleeve 12 and the cover 16 are substantially co-planar with the ground 19. The rack 26, guiderail assembly 34, actuator assembly 24, and other associated components may then be disposed within the sleeve 12 below ground. A plurality of cables may also be connected to, for example, components disposed within the rack 26. Such cables may be passed through, for example, the cable ports 20 of the sleeve 12 and the ports 20 may be sealed by means well known in the art. In addition, sufficient slack may be provided in the cables to permit the rack 26 to be translated between the retracted and extended positions. As the volume of the sleeve 12 is typically insufficient to accommodate the rack 26 and an operator, the pressurized gas source 48 and/or other components fluidly connected to the first and second cylinders 28, 32 may be activated using one or more controls disposed above the ground surface 19 and outside of the component management system 10. As shown in, for example, FIG. 3, once the rack 26 is connected to, for example, the actuator assembly 24 and the guiderail assembly 34, the rack 26 may be disposed a distance D above the base plate 22 while in the retracted position. The cover 16 may be connected to the sleeve 12 to seal opening 14. One or more locking mechanisms may then be engaged to lock the cover 16 in place with respect to the sleeve 12, thereby forming the substantially fluid-tight compartment 18. The pressurized gas source 48, air dryer 73, pressure regulator 50, and/or other components fluidly connected thereto may be utilized to pressurize the compartment 18 and maintain the component management system 10 at a positive pressure. Such a positive pressure may be, for example, approximately 2.5 PSIG.

To open the component management system 10, the cover 16 may be unlocked and removed from the sleeve 12. A valve 56 may then be operated to introduce pressurized gas from the pressurized gas source 48 and/or the regulator 50 to the first and second cylinders 28, 32 of the actuator assemblies 24 on both sides of the rack 26. As shown in, for example, FIG. 4, activating the cylinders 28, 32 may cause the pistons 29, 33, respectively, to extend therefrom, thereby raising the rack 26 in the direction of arrow 64. As the first cylinder 28 is activated, the cylinder 28 may raise the bracket 30 and the second cylinder 32 with respect to the base plate 22. In addition, as the second cylinder 32 is activated, the piston 33 may raise the rack 26 with respect to the bracket 30 and the base plate 22. The rack 26 may be elevated a distance E above the base plate 22, and the members 68, 70, 72 of the guiderail assembly 34 may guide the travel of the rack 26 in a path substantially perpendicular to the base plate 22. In an exemplary embodiment, the actuator assembly 24 may elevate the rack 26 such that a top of the rack 26 is a distance F of approximately 135.625 inches above the base plate 22. In an exemplary embodiment, extending the rack 26 to such an elevation may elevate the rack 26 substantially completely above the ground surface 19.

Once the rack 26 has been elevated to a desired height, operators may service the rack 26 and/or its components. After service is complete, the operator may also lower the rack 26 in the direction of arrow 66, back to the retracted position shown in, for example, FIG. 3. The rack 26 may be lowered by, for example, controlling the pistons 29, 33 to retract substantially within the first and second cylinders 28, 32, respectively. One or more of the valves 56 fluidly connected to the first and second cylinders 28, 32 may, for example, allow for the release of pressurized gas contained within the cylinders 28, 32 to facilitate retracting of the pistons 29, 33. Once the rack 26 has been properly lowered, the cover 16 may again be connected and/or sealed to the sleeve 12, and the substantially fluid-tight compartment 18 formed thereby may again be pressurized.

As shown in FIG. 5, in an additional exemplary embodiment in which the cover 16 is connected to the rack 26, the component management system 10 may be opened by unlocking the cover 16 from, for example, the sleeve 12, and operating the valve 56 (not shown) to introduce pressurized gas from the pressurized gas source 48 (not shown) to the first and second cylinders 28, 32 on both sides of the rack 26. As discussed above with respect to FIG. 4, activating the cylinders 28, 32 may cause the pistons 29, 33, respectively, to extend therefrom, thereby raising the rack 26 in the direction of arrow 64.

As shown in FIG. 5, the rack 26 may be elevated in this way any desirable distance above the base plate 22, and the members 68, 70, 72 of the guiderail assembly 34 may guide the travel of the rack 26 in a path substantially perpendicular to the base plate 22. While elevating the rack 26, the cover 16 may remain substantially connected to the rack 26, and the rack 26 may be elevated substantially completely above the ground surface 19 for servicing. As in the embodiment shown in FIG. 4, the rack 26 may be raised a distance of approximately 135.625 inches above the base plate 22, thereby enabling servicing of the components stored therein, and sufficient slack may be provided in the cables connected to such components to facilitate elevating the rack 26 to such levels. Once the rack 26 and/or its components have been serviced, the rack 26 may be lowered back to the retracted position shown in, for example, FIG. 3. The rack 26 may be lowered by, for example, controlling the pistons 29, 33 to retract substantially within the first and second cylinders 28, 32, respectively. Once the rack 26 has been sufficiently lowered, the cover 16 may be again connected and/or sealed to the sleeve 12. The cover 16 may also be locked into place relative to the sleeve 12 with the locking mechanisms discussed above.

It is understood that opening and/or closing the component management system 10 may include one or more additional processes. For example, to open the pressurized component management system 10, one or more controls may be operated to discontinue the flow of gas from the pressurized gas source 48 to the substantially fluid-tight compartment 18, thereby ceasing the internal pressurization of the compartment 18. In addition, once pressure is no longer detected within the compartment 18, one or more alarms, sensors, lights, or other indicators may be activated, thereby indicating to an operator that such pressurization has ceased. In addition, pressurized air within the compartment 18 may be allowed to dissipate through, for example, one or more vents, gaps, or other deflation mechanisms of the component management system 10. Such mechanisms may include, for example, one or more small gaps formed between, for example, the sleeve 12 and the cover 16. It is also understood that any of the indicator mechanisms discussed above may also be used to notify the operator that, for example, an appropriate amount of pressure has dissipated from the compartment 18 and that the cover 16 may be safely removed from the sleeve 12. Such indicators may also signal to the user that, for example, the lock assemblies have been properly disengaged and/or that the rack 26 has been fully lifted above the base plate 22 in the extended position.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A below ground component enclosure, comprising:
(a) a base plate disposed below a ground surface;
(b) a sleeve connected to the base plate and extending therefrom toward the ground surface;
(c) a cover sealably connected to an upper opening of the sleeve to form a substantially fluid-tight compartment with the base plate and the sleeve, the base plate forming a closed end of the compartment;
(d) a rack having a top, a bottom, and two sidewalls, the rack disposed within the compartment;
(e) an actuator assembly connected to the base plate and configured to move the rack from a retracted position to an extended position and to pass at least a portion of the rack through the opening, the actuator assembly including a bracket, first and second cylinder assemblies connected to the bracket, the first cylinder assembly having a first cylinder and a first piston and the second cylinder assembly having a second cylinder and a second piston; and
(f) a rack guiderail assembly connected to the base plate, the guiderail assembly comprising a set of directly interconnected guiderail plate segments overlapping in a retracted and extended position, the guiderail plate segments disposed parallel to the bracket.

2. The enclosure of claim 1, wherein the substantially fluid-tight compartment is maintained at a positive pressure when the cover is connected to the sleeve.

3. The enclosure of claim 1, wherein the guiderail assembly is connected to the rack and configured to govern motion of the rack when the actuator assembly is activated.

4. The enclosure of claim 3, wherein the guiderail assembly directs vertical movement of the rack through the upper opening of the sleeve.

5. The enclosure of claim 1, further including a pressurized fluid source fluidly connected to the first and second cylinder assemblies.

6. An underground enclosure comprising:
(a) a base plate forming a closed end of an underground enclosure;
(b) a first and second guiderail assembly connected to the base plate and each guiderail assembly having at least three slidably connected guiderail plate segments;
(c) a first and second cylinder assembly mounted to a bracket at different heights, each cylinder having a first end and a second end, the first end of the first cylinder assembly and a first guiderail plate segment of the first guiderail assembly are fixedly mounted relative to the base plate and the second end of the first cylinder assembly is fixedly mounted to the bracket;
(f) a rack mounted to the first and second quiderail assemblies wherein extending the first and second cylinder assemblies extends the guiderail plate segments and rack from a retracted position locating the bottom of the rack proximate the base plate to an extended position, the guiderail plate segments each overlapping by more than fifty percent in the retracted position and by less than fifty percent in the extended position, and wherein a third guiderail plate segment is slidably connected between the first and second guiderail plate segments and is free from the first and second cylinder assemblies.

7. The underground enclosure of claim 6, wherein each cylinder assembly includes a cylinder having a length that is at least one-half the length of each guiderail segment and a piston.

8. The underground enclosure of claim 6, wherein activating the first cylinder assembly elevates the second cylinder assembly along a path substantially perpendicular to the base plate.

9. The underground enclosure of claim 7, wherein the rack is connected to the piston of the second cylinder assembly.

10. The underground enclosure of claim 9, wherein the first and second cylinder assemblies are configured to elevate the rack a distance equal to approximately twice a stroke of the piston of one of the first and second cylinder assemblies.

11. The underground enclosure of claim 9, wherein the plurality of guiderails directs movement of the rack along a path substantially perpendicular to the base plate.

12. The underground enclosure of claim 9, wherein the first direction is toward the base plate and the second direction is away from the base plate.

13. An actuator assembly, comprising:
(a) a first cylinder assembly secured to a first bracket, the first cylinder assembly including a cylinder and a piston secured to a base plate and extendable from the first cylinder to elevate the bracket away from the base plate;
(b) a second cylinder assembly secured to the first bracket, the second cylinder assembly including a cylinder and a piston secured to a rack and extendable from the second cylinder to elevate the rack relative to the bracket from a retracted position proximate the base plate to an extended position; and
(c) a rack guiderail assembly comprising a set of directly interconnected guiderail plate segments disposed parallel to the first bracket, the guiderail assembly having a first guiderail plate coupled to the first cylinder assembly and a second guiderail plate coupled to the second cylinder assembly, wherein the first and second cylinders each have a length that is at least one-half the length of each guiderail plate.

14. The assembly of claim 13, wherein the first cylinder assembly elevates the bracket along a path substantially perpendicular to the base plate and the second cylinder assembly elevates the rack along a path substantially perpendicular to the base plate.

15. The assembly of claim 13, further including a guiderail assembly connected to the base plate and the rack and having a plurality of guiderails plates overlapping by more than fifty percent in the retracted position and overlapping by less than fifty percent in the extended position, the guiderail assembly selectively disposed to move the rack along a path substantially perpendicular to the base plate into the extended position.

16. The assembly of claim 13, further including a third cylinder assembly secured to a second bracket, the third cylinder assembly including a cylinder and a piston secured to the base plate and extendable from the third cylinder to elevate the second bracket away from the base plate.

17. The assembly of claim 16, further including a fourth cylinder assembly secured to the second bracket, the fourth cylinder assembly including a cylinder and a piston secured to the rack and extendable from the fourth cylinder to elevate the rack relative to the bracket.

18. The assembly of claim 17, wherein the first and third cylinder assemblies are extendable in unison to elevate the first and second brackets substantially vertically relative to the base plate from the retracted position to the extended position.

19. The assembly of claim 17, wherein the second and fourth cylinder assemblies are extendable in unison to elevate the rack substantially vertically relative to the base plate from the retracted position to the extended position.

20. The assembly of claim 17, wherein the guiderail assembly is substantially linearly extendable.

21. The assembly of claim 17, wherein the guiderail assembly is configured to guide linear motion of the rack along a path substantially perpendicular to the base plate.

22. The enclosure of claim 1, wherein the guiderail assembly comprises a plurality of guiderail segments, wherein a first guiderail plate segment and the piston end of the first cylinder assembly are connected to a base plate, the cylinder end of the first cylinder assembly and the cylinder end of the second cylinder assembly are connected to the bracket, and a second guiderail plate segment is connected to a piston end of the second cylinder assembly and the rack, and a third guiderail plate segment is slidably connected between the first and second guiderail plate segments and free from the first and second cylinder assemblies.

23. The enclosure of claim 1, wherein the first and second cylinder assemblies are mounted to a front planar surface of the bracket at different heights.

24. The enclosure of claim 1, wherein the substantially airtight compartment is formed of fiberglass reinforced polymer.

25. The enclosure of claim 24, wherein the fiberglass reinforced polymer is capable of dissipating approximately 6,000 BTU/hour.

26. The enclosure of claim 24, wherein the fiberglass reinforced polymer is capable of dissipating approximately 10,000 BTU/hour.

27. The enclosure of claim 25, wherein the substantially airtight compartment dissipates substantially more heat than is generated by equipment stored in the rack.

28. The enclosure of claim 6, further comprising a pressurized gas source coupled to a pressure regulator, the pressure regulator receiving a flow of pressurized gas from the pressurized gas source and providing a first output flow of approximately 75-80 PSI to the first and second cylinder assemblies, a second output flow to an interior of the substantially airtight component of approximately 2.5 PSI, and a third output to at least one of a set of locking mechanisms and a seal of approximately 25 PSI.

* * * * *